US008751197B2

(12) United States Patent
Burgos Gallego et al.

(10) Patent No.: US 8,751,197 B2
(45) Date of Patent: Jun. 10, 2014

(54) METHOD FOR DESIGNING A COMPOSITE MATERIAL PART WITH A CURVED SURFACE

(75) Inventors: Raúl Burgos Gallego, Madrid (ES); José Villarrubia Cortés, Madrid (ES)

(73) Assignee: Airbus Operations S.L., Madrid (ES)

(*) Notice: Subject to any disclaimer, the term of this patent is extended or adjusted under 35 U.S.C. 154(b) by 1262 days.

(21) Appl. No.: 11/796,744

(22) Filed: Apr. 27, 2007

(65) Prior Publication Data

US 2008/0208540 A1 Aug. 28, 2008

(30) Foreign Application Priority Data

Feb. 27, 2007 (WO) ................. PCT/ES2007/070038

(51) Int. Cl.
*G06F 17/50* (2006.01)
(52) U.S. Cl.
USPC ............................................................. 703/1
(58) Field of Classification Search
USPC ............................................................. 703/1
See application file for complete search history.

(56) References Cited

U.S. PATENT DOCUMENTS

| | | | |
|---|---|---|---|
| 6,232,980 B1 | 5/2001 | Liepa | |
| 6,613,258 B1 | 9/2003 | Maison et al. | |
| 2003/0071810 A1* | 4/2003 | Shoov et al. | 345/420 |

OTHER PUBLICATIONS

M. Aono et al., "Modeling methods for the design of 3D broadcloth composite parts", 2001, Computer-Aided Design, vol. 33, pp. 989-1007.*
B. Vermeulen et al. "Knowledge based design method for fibre metal laminate fuselage panels", 2005, Proceedings of DETC/CIE 2005, ten unnumbered pages.*
Gershon Elber, "Model fabrication using surface layout projection", 1995, University of Utah, pp. 1-22.*
Boris Ya Kolesnikov et at, "Carbon fiber composite airplane fuselage: concept and analysis", 2004, ILA International Conference, pp. 1-11.*
B.G. Prakash, "AUTOLAY—a GUI-based design and development software for laminated composite parts", 1999, Computers & Graphics, vol. 23, pp. 95-110.*
Supplementary European Search Report dated Feb. 11, 2014 for EP Application No. 07 73 0481.
Ledermann, Christof, et al., "Associative parametric CAE methods in the aircraft pre-design", Aerospace Science and Technology, vol. 9, No. 7, pp. 641-651, Oct. 1, 2005.

* cited by examiner

*Primary Examiner* — Kamini S Shah
*Assistant Examiner* — Russ Guill
(74) *Attorney, Agent, or Firm* — Ladas & Parry LLP

(57) ABSTRACT

The invention relates to a method for designing a composite material part with a curved surface (65) to which a plurality of stiffening elements will be joined, in which the design of a 3D fabric model comprises the following steps: generating a planar surface (63) developed in 2D of the surface (65) of the curved part in 3D as well as the same geometric references (71) in 2D as the references (51) of the surface in 3D; associating the surface (63) developed in 2D and the surface (65) in 3D as well as their geometric references (71, 51), such that any action in one of them is reflected in the other; initially computing the fabric model in the surface (63) developed in 2D; carrying out any subsequent modification of the fabric model either in the surface (63) developed in 2D or in the surface (65) in 3D.

6 Claims, 5 Drawing Sheets

METHOD FOR DESIGNING A COMPOSITE MATERIAL PART WITH A CURVED SURFACE

FIELD OF THE INVENTION

The present invention relates to a method for designing a composite material part with a curved surface and more particularly, for designing a composite material part with a curved surface such as a tubular part, to which stiffening elements such as transverse frames and longitudinal stringers will be joined.

BACKGROUND OF THE INVENTION

In several engineering fields there is a strong tendency to increase the amount of parts made of composite materials. For example, in the aeronautic field, wing skins, coating panels and fuselage sections are parts which can be manufactured using composite materials.

These parts are generally made with laminates of composite material fabrics with carbon fibers arranged in different orientations.

These parts are designed by means of a complex process comprising calculation steps, steps for designing the fabric model and for analyzing their producibility, with feedback loops when modifications are introduced in any of these steps.

Engineers who are specialists in calculations use calculation programs to calculate the performance of the part under given loads, and design engineers use CAD systems to generate the fabric model, i.e. define the location and contour of the fabrics forming the laminate, from the laminate specifications provided by the results of the calculation.

Even with CAD systems functionalities, the process for generating the mentioned fabric models in CAD systems is a tedious process involving a large amount of repetitive manual work, with the subsequent risk of failures, especially in the case of curved parts in which the definition of the contour of the fabrics, ensuring that certain requirements are complied with, is very complex and laborious.

Although the process can be more or less simplified depending on the CAD system used, when the designers are faced with complex support surface where the geometric computation is slow, the times for generating the fabric models of the parts can be excessively long. The designer may lose his or her concentration, making more mistakes due to the downtimes that the CAD system generates in the geometric operation computation. This is added to the fact that in some cases such as in tubular surfaces, the fabric model can be so complex that after hours of work, there is no clear vision of the work done due to the confusion caused by the geometry intersection in three-dimensional space.

The present invention intends to solve this problem.

SUMMARY OF THE INVENTION

An object of the present invention is to reduce the time currently used in designing fabric models of composite material parts with a curved surface.

The previous and other objects are achieved by providing a method for carrying out the phase for designing the fabric model from a process for designing a composite material part with a curved surface to which a plurality of stiffening parts oriented in planes that are considerably perpendicular to said curved surface will be joined, by means of the following steps:

- Generating a planar surface developed in 2D of the surface of the curved part as well as the same geometric references in 2D as the references of the curved surface in 3D.
- Associating the surface developed in 2D and the curved surface in 3D as well as their geometric references, such that any action in one of them is reflected in the other.
- Initially computing the fabric model in the surface developed in 2D.
- Carrying out any subsequent modification of the fabric model either in the surface developed in 2D or in the curved surface in 3D.

Another object of the present invention is to provide a computer tool which can be used together with a CAD system to implement the mentioned model.

This object is achieved by means of a tool which, among other functionalities, allows carrying out the following actions:

- Developing in 2D the same geometric elements used in a CAD system for designing a fabric model.
- Associating the 2D and 3D environments by means of a Composite Surface with a 2D domain and a 3D domain.
- Updating the CAD system with the information resulting from the work in any of said domains.

Other features and advantages of the present invention will be apparent from the following detailed description of the embodiments illustrating its object together with the attached figures.

DETAILED DESCRIPTION OF THE INVENTION

Figure 1:
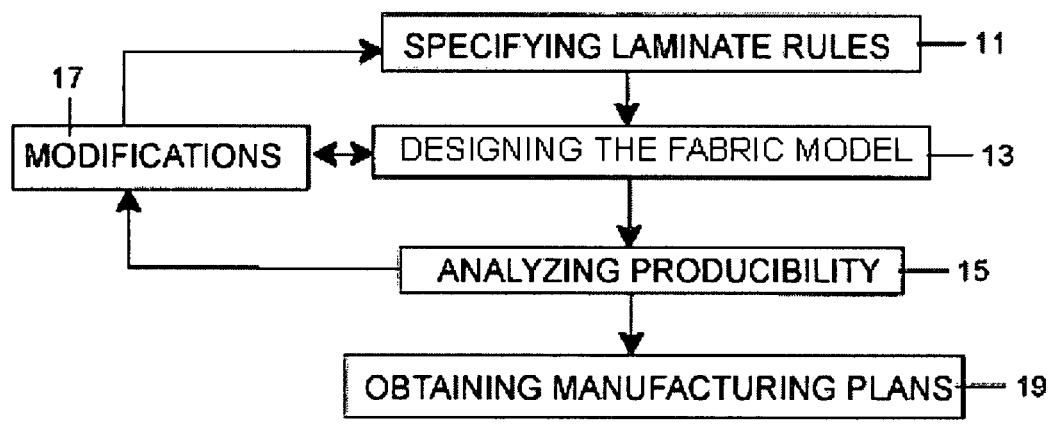
FIG. 1 shows a block diagram illustrating the method for designing a composite material part.

The design of a composite material part is a complex process which, as shown in FIG. 1, comprises a first phase 11, in which the basic data of the laminate are specified taking into account the loads that it must support, a second phase 13 in which the fabric model is designed, a third phase 15 in which the producibility of the design is analyzed, a fourth phase 17 in which the design is possibly modified, in which case, the previous corresponding step is repeated to carry out the corresponding adjustments, and a final phase 19 in which the information required to manufacture the part is obtained.

Figure 2:
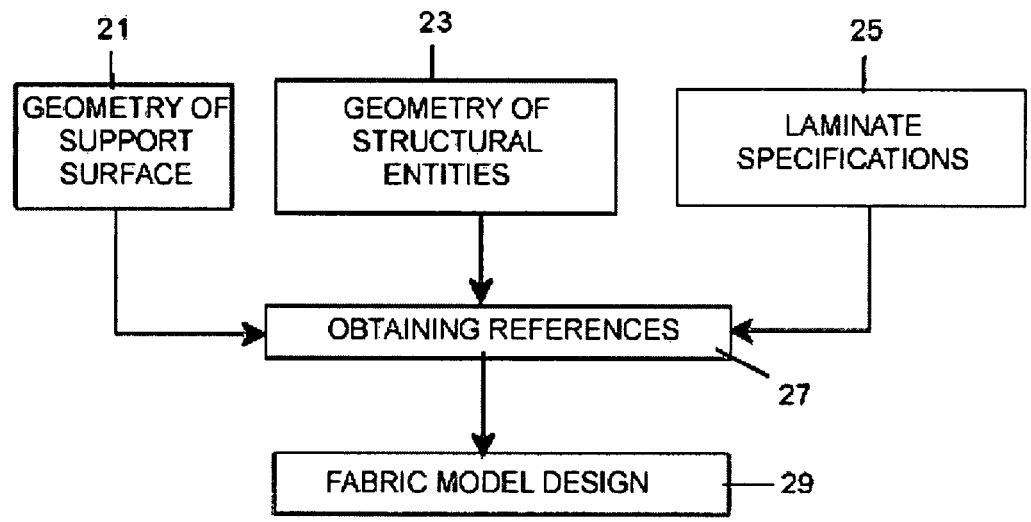
FIG. 2 shows a block diagram illustrating the method used in the prior art for generating the fabric model.

In the context of this process, the present invention relates to the phase 13 for designing the fabric model of a curved surface part using a CAD system. In the known art, this phase is developed following the scheme of FIG. 2.

The inputs of this phase are:

The geometry of the surface of the curved part 21 on which the fabrics will be supported, which will be denominated support surface.

The representation geometry of the structural entities 23, understanding that these are parts which will be joined to the curved part and the situation of which must be considered in the design of the fabric model. Said structural entities are, for example, stiffening elements of the curved part such as the frames or stringers used in aeronautic structures and the representation geometry thereof consists of planes or other surfaces intercepting the support surface.

Specifications of the laminate 25, indicating to the designer how the contours of the fabrics must be located on the support surface.

Based on said geometries 21, 23, the 3D references necessary for generating the fabric model are obtained in a first step 27, which references basically consist of the intersections of the structural entities with the support surface and in curves parallel thereto.

From said references, the design of the fabric model in 3D, i.e. the definition of the contours of the different fabrics forming the laminate of the part, is carried out in a second step 29.

Figure 3:
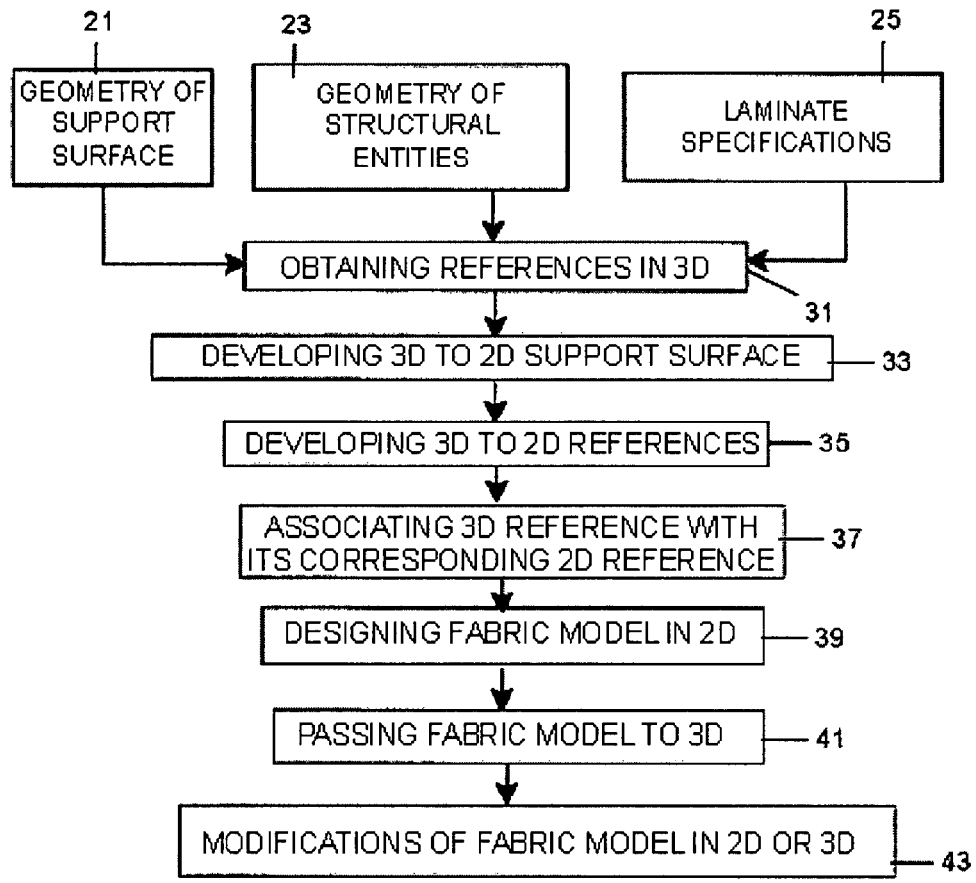
FIG. 3 shows a block diagram illustrating the method for generating the fabric model according to the present invention.

In the method according to the present invention, the phase for designing the fabric model is developed by following the scheme of FIG. 3 which will be explained in detail below in relation to an embodiment of the invention applied to a tubular curved part stiffened with transverse frames and longitudinal stringers.

The starting data are the same as those used in the known art: the geometry of the support surface 21, the geometry of the structural entities 23 (i.e. the frames and the stringers) and the specifications of the laminate 25.

Figure 4:
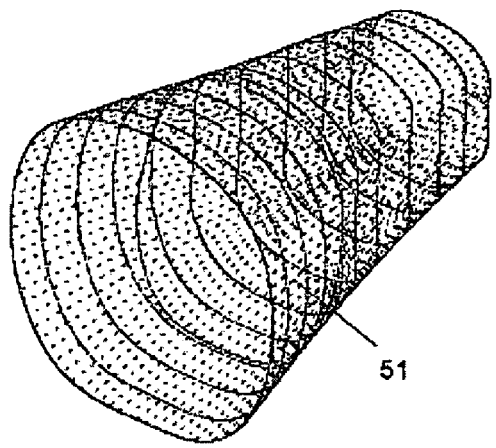
FIG. 4 shows the intersections of a tubular curved surface with an assembly of structural entities.
Figure 5:
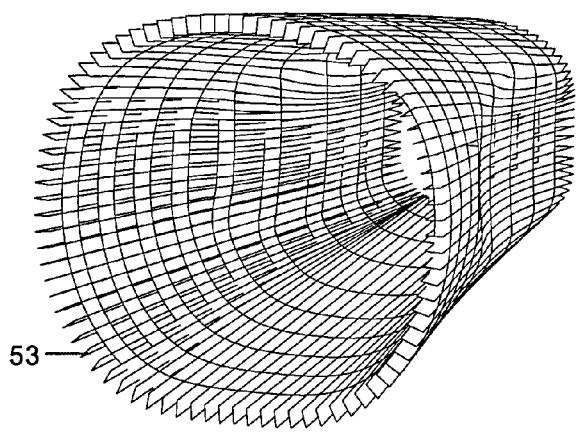
FIG. 5 shows the step of the method for generating the fabric model according to the present invention in which the 3D references are generated.

In a first step 31, the 3D references are generated by means of the following steps:

a) The intersections between the planes of the structural entities with the support surface are created. This will give rise to an intersection curve 51 for each structural entity (see FIG. 4).

b) As many raised surfaces per intersection created in the previous step are created, such that a line will be scanned, taking the intersection itself as the spine. The resulting surfaces 53 may be normal to the support surface or coincide with the plane of the rising structural entity (see FIG. 5).

Figure 6:
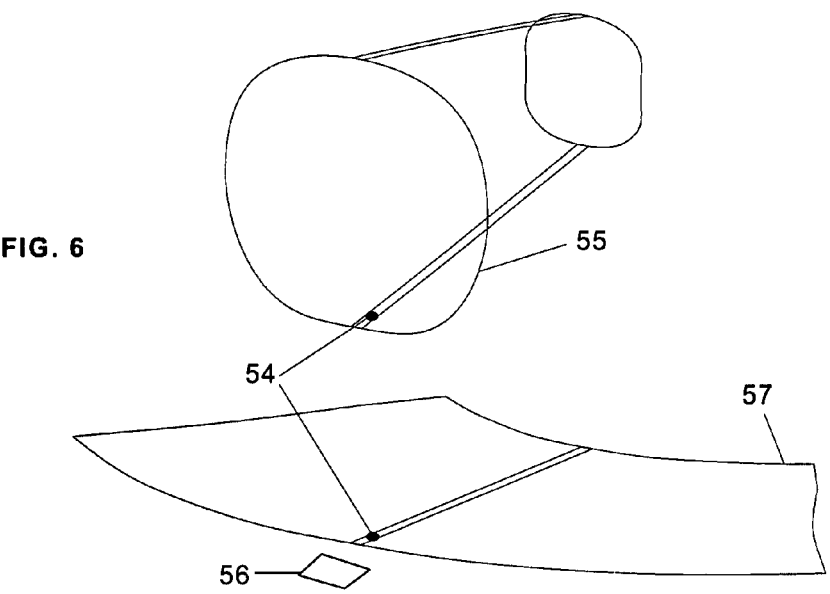
FIG. 6 shows the step of the method for generating the fabric model according to the present invention in which the curved support surface is developed in 2D, one of the elements of the 2D environment being generated.

In a second step 33, the curved surface is developed in a plane. i.e. in 2D, by means of the following steps:

a) The outer contour 55 of the support surface is created and the development plane 56 is created (see FIG. 6).

b) The contour 57 is developed on the development plane 56 using reference point 54 (see FIG. 6).

Figure 7:
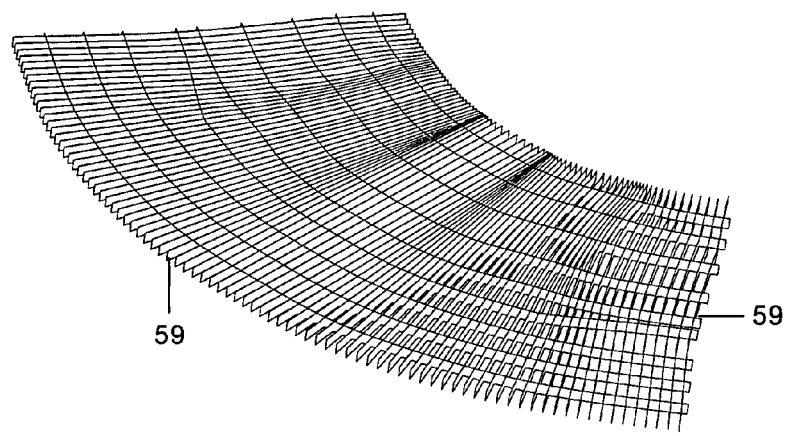
FIG. 7 shows the development in 2D of the 3D references using the method for generating the fabric model according to the present invention.

In a third step 35, the 3D to 2D references are developed by means of the following steps:

a) All the intersections of the structural entities with the support surface are developed on the development plane 56.

b) As many raised surfaces 59 per intersection developed in the previous step are created, such that a line will be scanned, taking the developed curve itself as the spine. The resulting surfaces will be normal to the development plane 56. These surfaces can also be obtained by means of the extrusion of the developed curves taking the normal of the development plane 56 as the direction (see FIG. 7).

Figure 8:
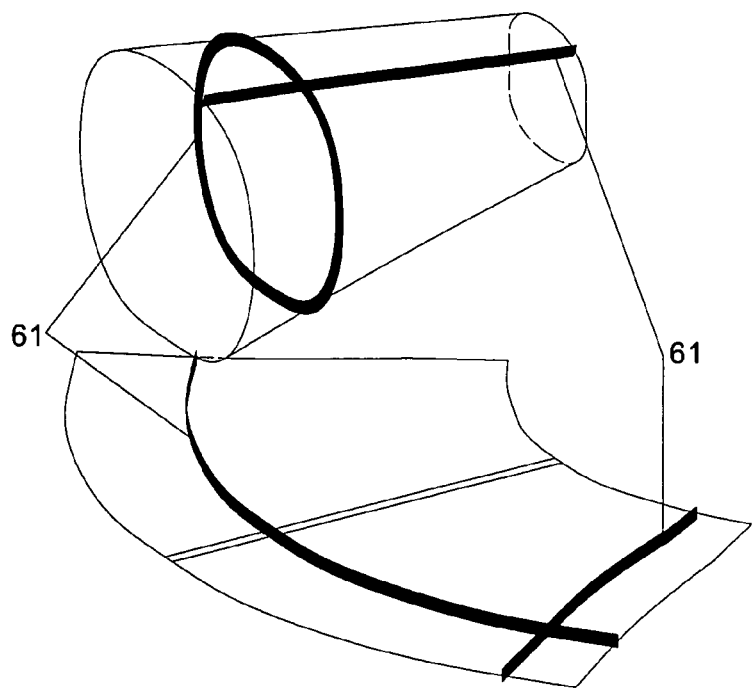
FIG. 8 shows the association between the 2D and 3D references according to the present invention.
Figure 9:
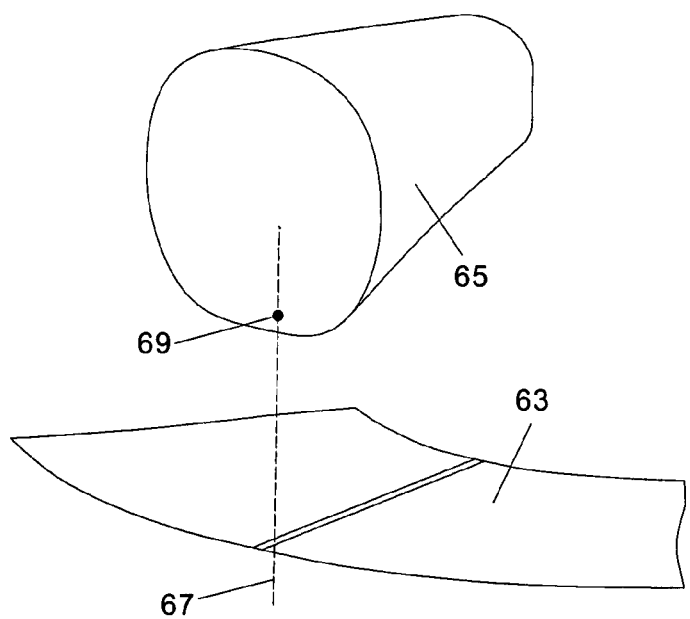
FIG. 9 shows the switching entity between the 2D and 3D environments used in the present invention.
Figure 10:
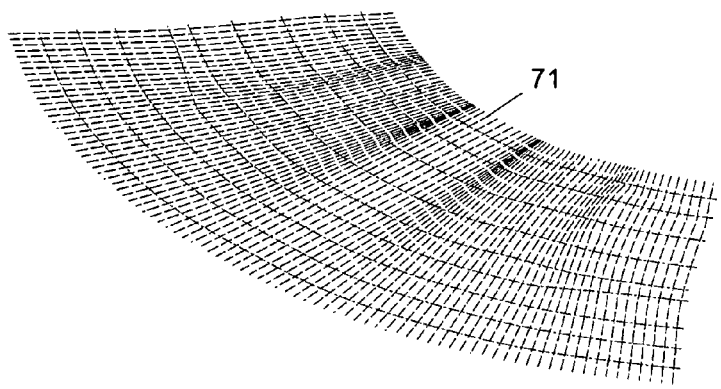
FIG. 10 shows the geometric references in 2D obtained according to the present invention.

In a fourth step 37, each 3D reference is associated with its corresponding 2D reference by means of the following steps:

a) Joints are created in twos between the raised surfaces 53, 59 obtained in 3D and 2D; in other words, junctions are made in pairs (one point in one of the raised surfaces together with another corresponding point in the other of the raised surfaces) in the raised surfaces 53, 59 obtained in 3 dimensions and 2 dimensions. The result will be a composite surface 61 with two domains, one in 3D and the other in 2D, per structural entity (see FIG. 8).

b) A planar surface 63, a support surface replica 65 on which the new surfaces will be supported, as well as a curve 67 which in turn intercepts the planar surface 63 and the support surface replica 65 are created by filling the outer contour developed in step b). The intersection point 69 will be the switch changing the references between the 2D domain and the 3D domain. Out of the two domains contained in the composite surface, the one closest to point 69 will be activated. If working in 2D is desired, the intersection with the planar surface 63 will be calculated. If working in 3D is desired, the intersection with the support surface replica 65 will be calculated. This point 69 will be the geometric reference causing the selection of one domain or the other (2D or 3D) as the generating entity while creating the contours of the fabrics. The 2D domain of the composite surface 61 is isolated if it is desired to work in a plane. The 3D domain of the composite surface 61 is isolated if it is desired to work in a curve, substituting the planar surface 63 with the support surface replica 65 (see FIG. 9).

c) References 71 are created in 2D (see FIG. 10).

Figure 11:
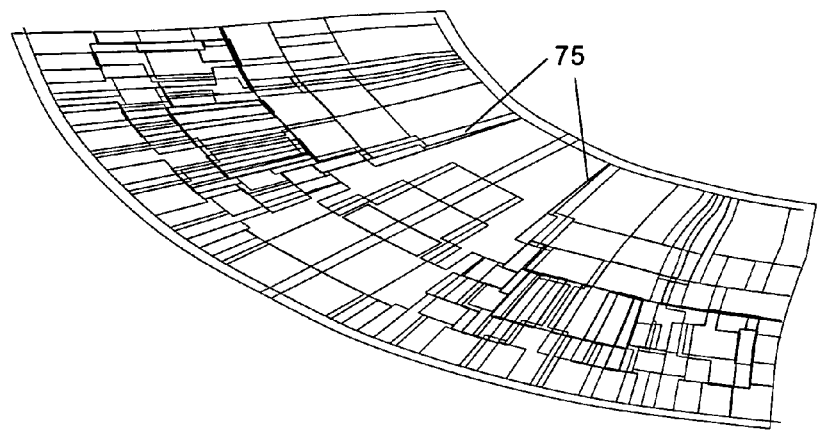
FIGS. 11 and 12 show the fabric model generated by using the method of the present invention in 2D and in 3D.

In a fifth step 39, the contours 75 of the fabrics are created in 2D (see FIG. 11).

Figure 12:
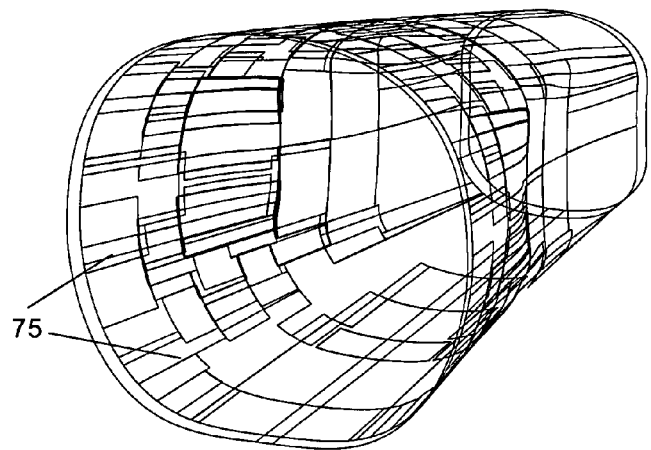

In a sixth step 41, the fabric model is passed into the 3D environment (see FIG. 12).

In an optional seventh step 43, the fabric model can be modified both in the 2D environment and in the 3D environment.

As deduced from the foregoing, the basic principle of the method according to the present invention consists of preparing the same starting information in the 3D and in the 2d environment for the purpose of generating references 51, 71 in 3D and in 2D respectively, and of being able to change from one environment to the other according to the needs of the designer.

To implement the method, a series of computer tools is used together with a conventional CAD system or a system included therein, which computer tools carry out the mentioned operations and particularly those relating to:

Developing in 2D the geometries of the curved surface and of the structural entities.

Using the mentioned composite surface by activating the 3D domain or the 2D domain in order to work in either one.

Updating the CAD system with the information resulting from the work in any of said domains.

The present invention is applicable to both "developable" curved surface and to "non-developable" curved surfaces in the strictly mathematical sense of these terms. In this sense and as will be understood by persons skilled in the art, one of the known methods of "flattening" "non-developable" surfaces can be used in the case of "non-developable" surfaces in the generation of the 2D environment.

Those modifications comprised within the scope defined by the following claims can be introduced in the preferred embodiment which has just been described.

The invention claimed is:

1. A method implemented on a computer having a memory and a processor coupled to the memory for designing a composite material part with a curved surface (65) to which a plurality of stiffening elements oriented in planes substantially perpendicular to said curved surface are joined, including a design of a three dimensional (3D) fabric model defining contours of fabrics which are to be stacked to shape said composite material part from geometric references relating to said part with a curved surface (65) and to said stiffening elements, said design of the 3D fabric model comprising the following steps:

generating, using the processor, references (51) of the curved surface in 3D, the references (51) comprising an intersection curve for each stiffening element including intersections between a plane of the stiffening element with a support surface, including as many raised surfaces (53) per intersection created between the planes and the support surface;

generating, using the processor, a planar surface (63) developed in two dimensional (2D) corresponding to the curved surface (65) of the part in 3D and generating geometric references (71) in 2D corresponding to the references (51) of the curved surface in 3D, said generating including creating raised surfaces (59) in 2D per intersection of the stiffening element with the support surface;

associating the planar surface (63) developed in 2D with the curved surface (65) in 3D and associating the geometric references (71) with, the corresponding references (51) of the curved surface in 3D, such that any action in one of the surfaces is reflected in the other, said associating including creating junctions in pairs in the raised surfaces (53, 59) obtained in 3D and 2D, resulting in a composite surface (61) with two domains, one domain in 3D and the other domain in 2D, per stiffening element;

computing the fabric model in the surface (63) developed in 2D; and carrying out any subsequent modification of the fabric model either in the surface (63) developed in 2D or in the curved surface (65) in 3D, wherein an intersection point (69) is a reference point which changes selection between the 2D domain and the 3D domain, and wherein at least some of the steps of said method are performed using said processor.

2. The method for designing a composite material part with a curved surface (65) according to claim 1, wherein the part with a curved surface is tubular and the stiffening elements comprise transverse frames and longitudinal stringers.

3. A non-transitory computer-readable medium storing a program which, when executed by a computer together with a CAD system or a system included therein, causes implementation of the method of claim 2.

4. A non-transitory computer-readable medium storing a program which, when executed by a computer together with a CAD system or a system included therein, causes implementation of the method of claim 1.

5. The method for designing a composite material part with a curved surface (65) according to claim 1, wherein the association between the planar surface(63) developed in 2D with the curved surface (65) in 3D, and the geometric references (71) with the corresponding references (51) of the curved surface in 3D, is carried out by creating the composite surface (61) with a 2D domain and a 3D domain for each stiffening element wherein the intersection point (69) is a geometric reference causing selection of the 2D domain or the 3D domain while creating the contours of the fabrics.

6. A non-transitory computer-readable medium storing a program which, when executed by a computer together with a CAD system or a system included therein, causes implementation of the method of claim 5.

* * * * *